United States Patent [19]

Parkes

[11] Patent Number: 5,131,483
[45] Date of Patent: Jul. 21, 1992

[54] SINGLE LEVER CONTROL

[75] Inventor: Donald H. Parkes, Lamoni, Iowa

[73] Assignee: Shivvers, Inc.

[21] Appl. No.: 647,455

[22] Filed: Jan. 28, 1991

[51] Int. Cl.⁵ .................. B62D 11/04; B60K 26/00
[52] U.S. Cl. .................. 180/6.48; 180/333; 74/471 XY
[58] Field of Search .............. 180/6.48, 6.66, 333, 180/336; 74/471 XY, 473 R

[56] References Cited

U.S. PATENT DOCUMENTS

| | | | |
|---|---|---|---|
| 2,941,609 | 6/1960 | Bowers et al. | 180/6.48 |
| 3,306,385 | 2/1967 | Kempson | 180/6.48 |
| 3,323,607 | 6/1967 | Futamata | 180/6.48 |
| 3,528,519 | 9/1970 | Case | 180/6.48 |
| 3,540,220 | 11/1970 | Lauck | 180/6.48 X |
| 3,541,877 | 11/1970 | Houk | 180/6.48 X |
| 3,613,817 | 10/1971 | Glass | 180/6.48 |
| 3,620,096 | 11/1971 | Scolari | 180/6.48 X |
| 3,891,042 | 6/1975 | Braun | 180/6.48 |
| 4,085,812 | 4/1978 | Robinson et al. | 180/6.48 |
| 4,152,950 | 5/1979 | Langford | 74/471 XY X |
| 4,213,484 | 7/1980 | Habiger | 74/471 XY X |
| 4,572,019 | 2/1986 | Suzuki | 74/471 XY |
| 4,736,647 | 4/1988 | Shimoie et al. | 180/333 X |
| 4,799,398 | 1/1989 | Asano | 180/19.1 X |
| 4,809,796 | 3/1989 | Yamaoka et al. | 180/6.48 |

OTHER PUBLICATIONS

Advertising Literature from Schweiss entitled "Schweiss Magnum Lawn Mowers".
Advertising Literature from Quadrastat Corporation.

Primary Examiner—Charles A. Marmor
Assistant Examiner—Kevin T. Hurley

[57] ABSTRACT

A single lever control is disclosed. The single lever control comprises a lever, a lever mount, and a control rod having first and second ends, the lever is attached to the lever mount and the control rod and the lever is movable in a first plane about any axis and causes both tandem and reciprocal movement of said first and second control rod ends with respect to one another in response to movement of the lever.

26 Claims, 5 Drawing Sheets

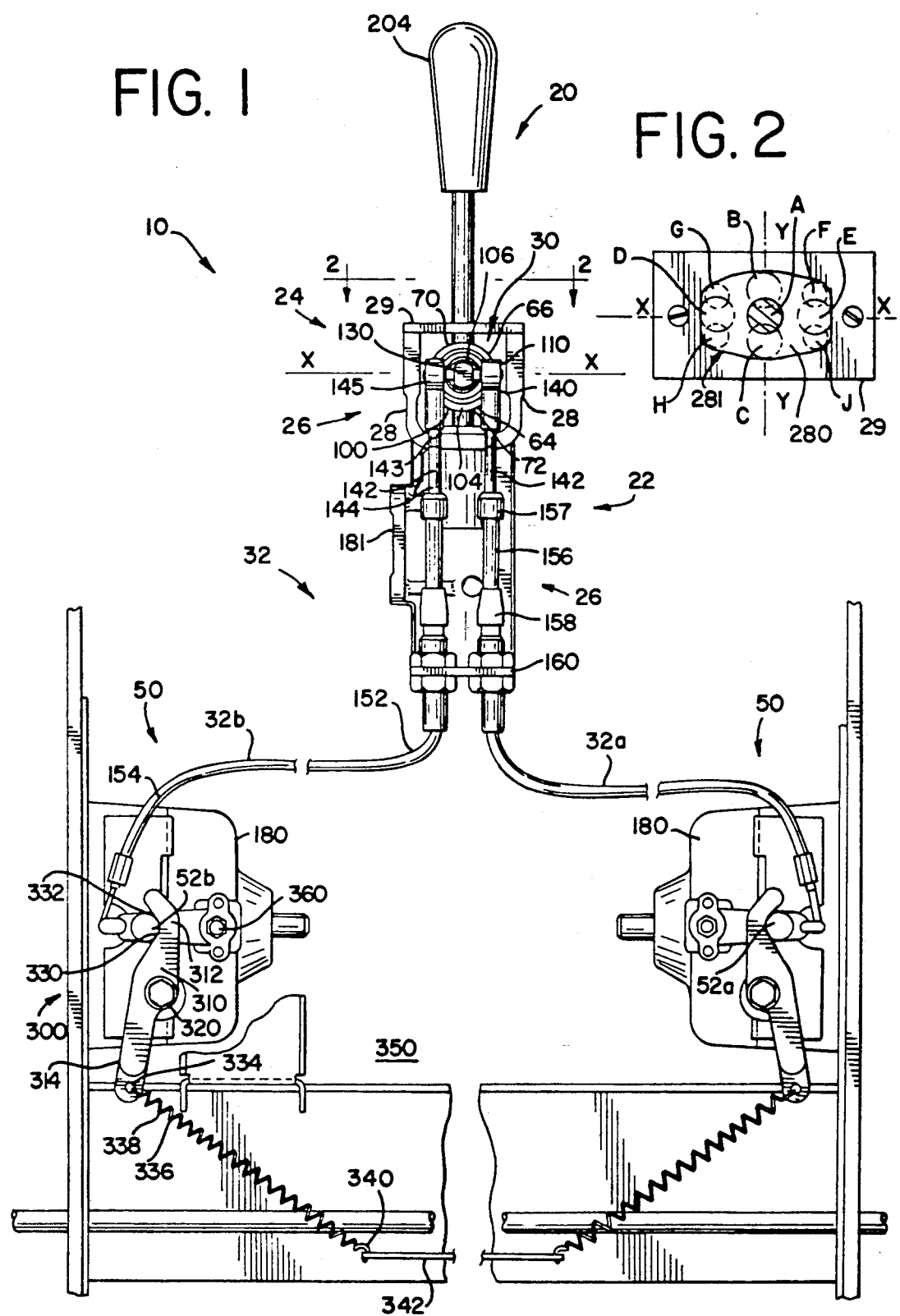

FIG. 5
FIG. 7
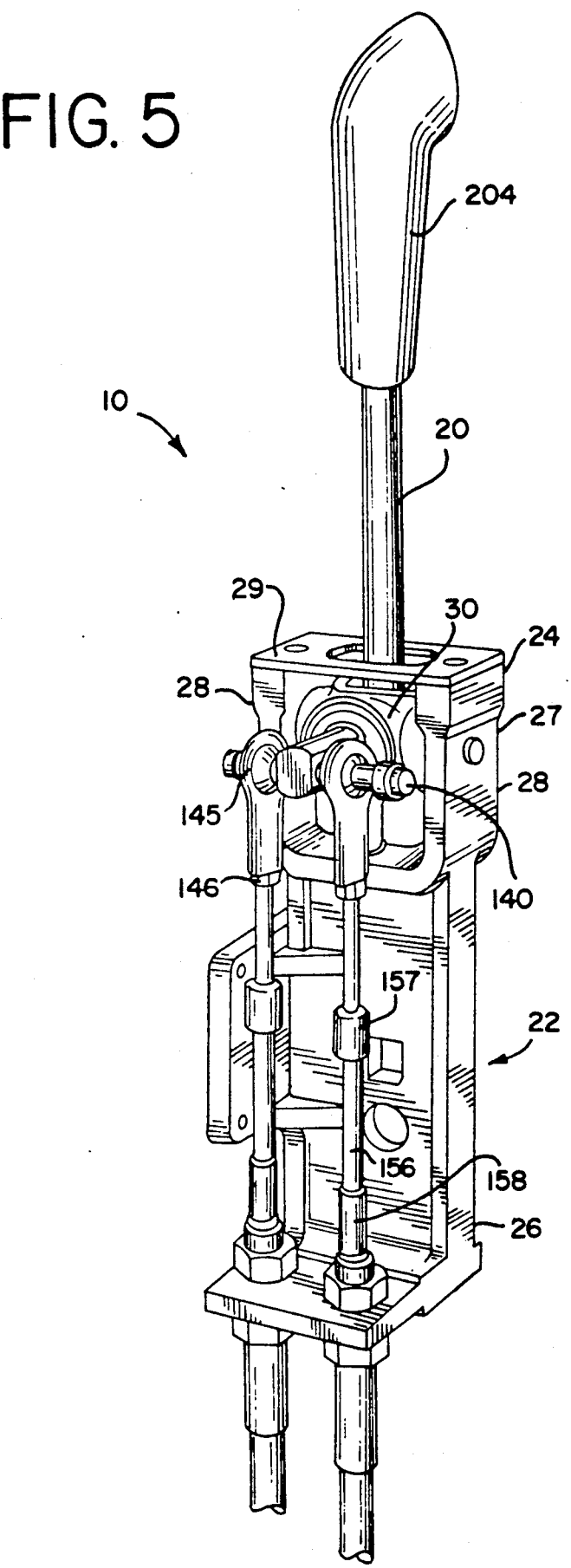
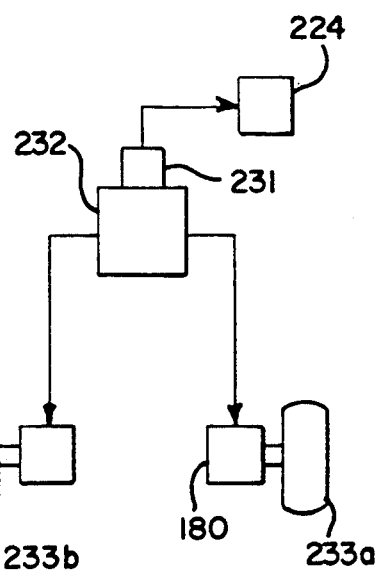

SINGLE LEVER CONTROL

DESCRIPTION

1. Technical Field

The present invention generally relates to a control apparatus and specifically to a single lever control that may be used to control, among other things, a zero turning radius vehicle.

2. Background of the Invention

A single lever control may be used to control a variety of mechanisms. For example, a single lever control may be connected to a set of cables or a set of connected rods and used to control independent hydrostatic transmissions that drive wheels on opposite sides of a zero turning radius vehicle. The speed and direction of a zero turning radius vehicle may therefore be controlled by varying the speed of each wheel. By driving one wheel faster than the other it will cause the vehicle to turn about the wheel that is moving more slowly.

A zero turning radius vehicle may be used for a variety of purposes. For example, a zero turning radius vehicle may be fitted with grass cutting equipment and used as a riding lawn mower. The maneuverability of the zero turning radius vehicle allows an operator to cut around objects, such as trees, with ease.

Prior attempts at providing a lever control system for a zero turning radius vehicle has required mounting a right and left control lever on either side of an operator's seat. The right control lever would control the speed of the right wheel and, conversely, the left control lever would control the speed of the left wheel. The operator of a zero turning radius vehicle would operate one lever by each hand thereby requiring the operator to coordinate the movement of each hand to turn the vehicle or to make the vehicle drive in reverse. However, this dual lever control system may sometimes be difficult to operate for the beginning or unskilled operator.

Therefore, it is desirable to provide a single lever control which allows the operator to control the vehicle with one hand. This eliminates the need to coordinate one hand with the other in turning and backing. This single lever control also eliminates the need for a second lever arm thereby reducing the cost of the controls.

Other companies such as Schweiss, Incorporated provide a single lever control system for a zero turning radius vehicle. However, Schweiss uses a hydraulically driven control. The hydraulic control system is inherently more complicated and expensive to install and to operate than a single lever cable or rod control. For this reason it is desirable to provide an inexpensive method of providing a single lever control for a zero turning radius vehicle.

SUMMARY OF THE INVENTION

The present invention, which may be referred to as a joystick or joystick control, may be used for controlling a pair of cables or a pair of connected rods, which ultimately controls an apparatus such as a zero turning radius vehicle.

According to the present invention, the joystick control comprises a lever having first and second portions and a lever mount disposed between the first and second lever portions to present a pivotal fulcrum. A pair of cables or set of connected rods with opposed first and second ends have each of the first cable or rod ends attached to the lever, wherein movement of the lever provides both tandem and reciprocal displacement of the cables or rods. The second end of the cables or rods are attached to a mechanism to be controlled by the joystick.

According to another aspect of the present invention, an ignition disabling switch is provided in connection with the joystick. The switch is activated and deactivated by movement of the joystick from an operating position to a nonoperating position, preventing starting and movement of the vehicle unless the operator is in position to control it.

According to another aspect of the present invention, a means for limiting the movement of the joystick through a desired range of motions is associated with the joystick. Preferably the joystick is disposed through a template that limits the range of movements of the joystick to a desired range of motions.

According to another aspect of the invention, a means for returning the joystick to a neutral position is also associated with the joystick. A return to neutral mechanism moves the joystick to a neutral position when the joystick is not being operated.

BRIEF DESCRIPTION OF DRAWINGS

FIG. 1 is a schematic representation of the present invention using cables to control two independent hydrostatic transmissions;

FIG. 2 is an end view taken along line 2—2 of FIG. 1;

FIG. 5 is a perspective view of the present invention;

FIG. 7 is a schematic representation of the power drive system of the zero turning radius vehicle.

DETAILED DESCRIPTION

Figure 1A:
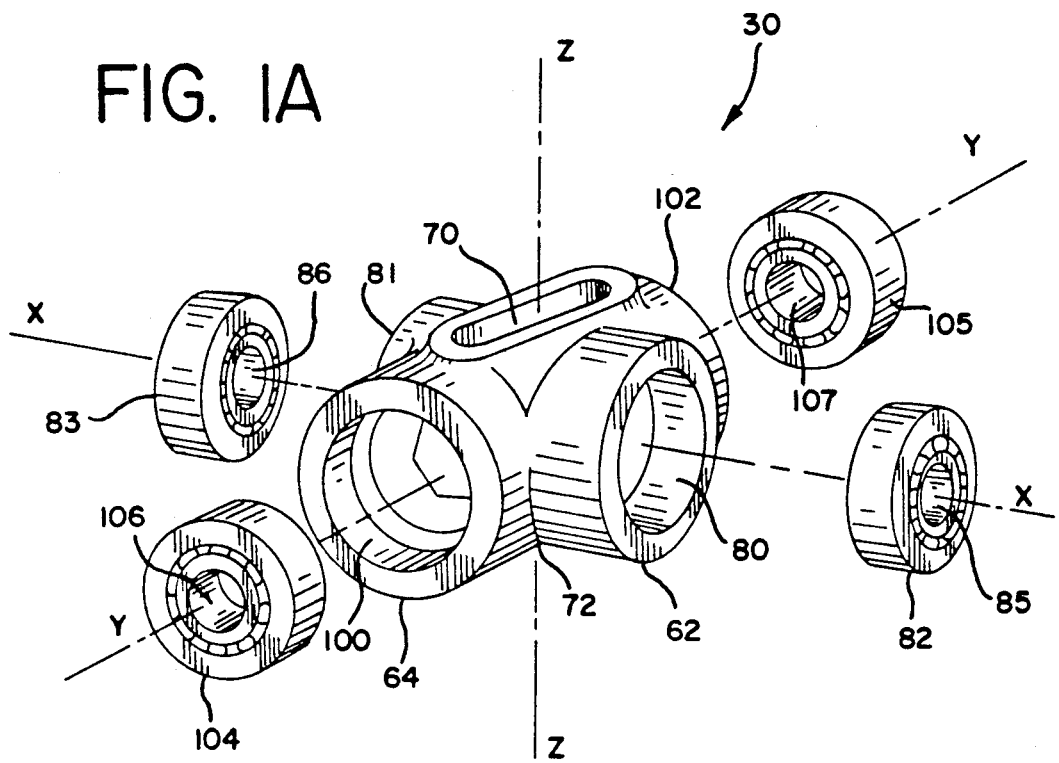
FIG. 1A is an exploded view of the lever mount of the present invention.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

FIG. 5 shows a single lever control or a joystick control 10 having a joystick 20 mounted in a frame 22. The frame 22 has first and second ends 24, 26. The first end 24 of the frame 22 has a yoke 27 having a pair of tines 28 in spaced relation tat terminate at an endplate 29. A lever mount or pivot block 30 is pivotally mounted within the frame 22. The lever mount 30 presents a pivotal fulcrum for the joystick 20 allowing the joystick to move through a range of motions.

Figure 6:
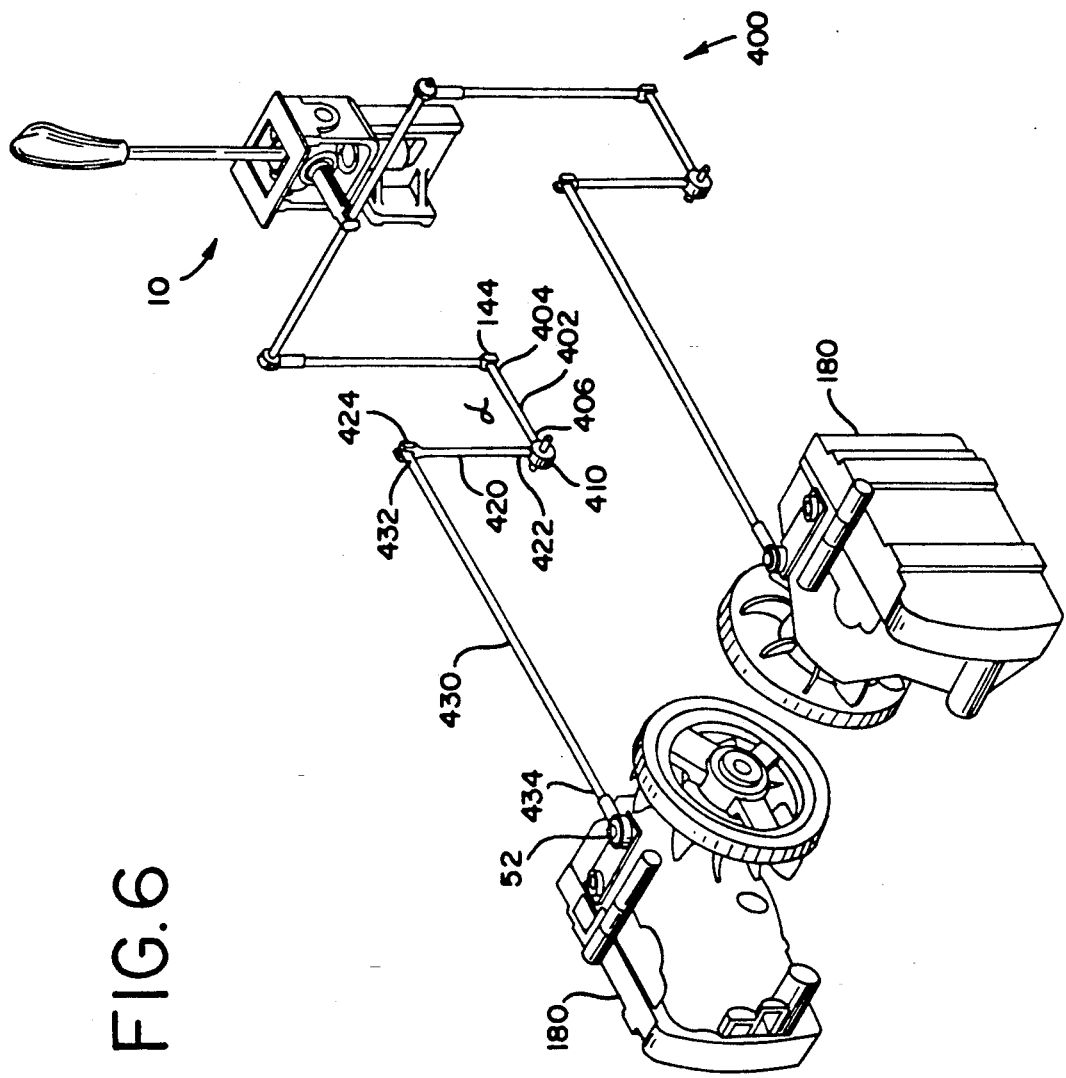
FIG. 6 is a perspective view of the present invention using a set of connected rods to control independent hydrostatic transmissions.

As described in greater detail below and as seen in FIG. 1, a pair of cables 32 are responsive to movement of the joystick 20 causing both tandem and reciprocal movement of the cables 32. Also discussed below and as shown in FIG. 6, a set of connected rods 400 may be used instead of the cables 32. The cables 32 link the joystick 20 to a mechanism 50 that has lever controls 52. The lever controls 52 are responsive to movement of the cables 32 so that the mechanism 50 may be controlled by movement of the joystick 20.

Figure 1B:
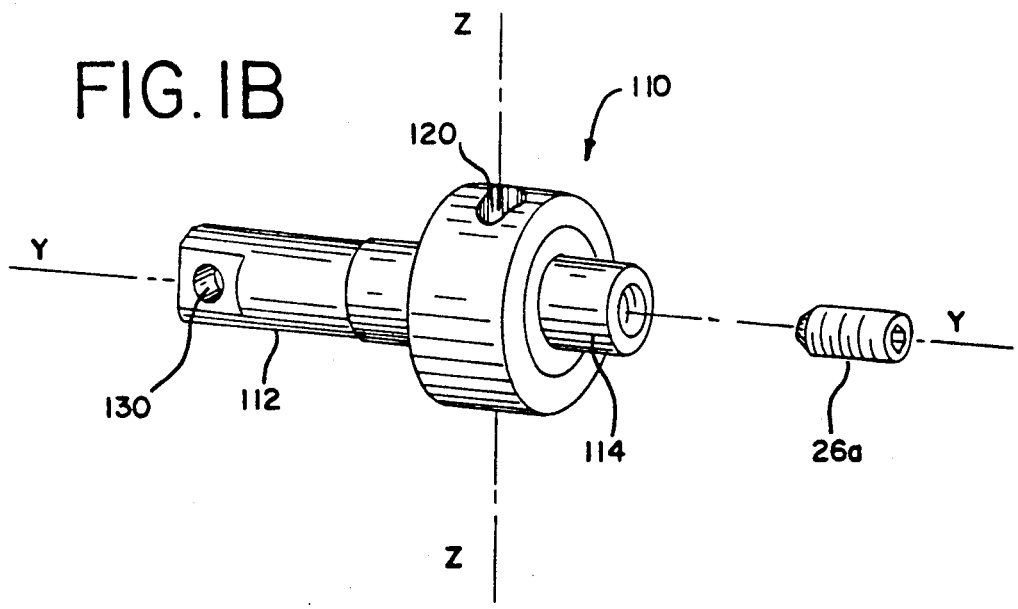
FIG. 1B is an exploded view of a shaft in the present invention.

More specifically, the lever mount 30 has first and second cylinders 62 and 64 integral with one another. The first cylinder 62 has a first axis along line X—X of FIG. 1. The second cylinder 64 has a second axis along line Y—Y of FIG. 1 that is substantially perpendicular to the first axis as seen in FIG. 1A. The lever mount 30 has an oval-shaped top and bottom opening 70 and 72 in alignment and adapted to receive the joystick 20 and to accommodate movement of the joystick 20 along line Y—Y. The joystick 20 is also movable along line Z—Z from a downward position to an upward position. (See FIGS. 3 and 4).

Each end of the first cylinder 62 has bearing races 80 and 81 and a set of sealed bearings 82 and 83 disposed respectively in the bearing races 80, 81. A set of bronzed bearings or other bearing types would also be appropriate.

Each set of bearings 82 and 83 have a central opening 85 and 86. The lever mount 30 is mounted between the tines 28 of the yoke 27 by inserting a pair of trunion pins 87 through holes 90 and 92 provided in the opposed tines 28 and through the central openings 85, and 86 in the bearings 82 and 83. The lever mount 30 is therefore rotatable within the tines 28 of the yoke 27 about the line X—X.

The second cylinder 62 similarly has races 100, 102 at opposed ends and a set of sealed bearings 104, 105 having central openings 106 and 107 in alignment. The bearings 104 and 105 are disposed respectively within races 100, 102. A shaft 110 is inserted through the central openings 106 and 107 and rotates about line Y—Y of FIG. 1. The shaft 110 has first and second opposed ends 112, 114. (See FIG. 1B). Shaft 110 has a first bore 120 at an intermediate portion that is in alignment with the top and bottom oval-shaped openings 70, 72 of the lever mount 30. The bore 120 is dimensioned to receive the joystick 20.

The shaft 110 has a second bore 130 proximate the first shaft end 112. A cross bar 140 is fixedly inserted through the second shaft bore 130 such that the cross bar 140 is substantially perpendicular to line Y—Y and substantially parallel to line X—X. Control rods 142 each have first 143 and second ends 144. The first end 143 of each control rod 142 has ball joints 145 that rotatably mount on the cross bar 140 at opposite sides of the second shaft end 114. Preferably each ball joint 145 is located equidistant from the first shaft end 112. The distance the ball joint is from the first shaft end 112 versus the distance the second bore 130 determines the sensitivity of the lateral movement of the zero turning radius vehicle.

Cable length adjustment nuts 146 are provided adjacent the ball joints 145 for fine adjustment of the cable 32 length.

The cables 32, each having first and second ends 152 and 154, have each of their first cable end 152 attached to each of the second control rod ends 144. The endmost portion of the second control rod ends 144 (not shown) are crimped about the first cable end 152 thereby coupling the control rods 142 to the cables 32.

Sleeves 156 and dust covers 157 and 158 are provided to cover the second control rods ends 144 and the first cable ends 152 proximate where the control rods 142 couple to the cables 32 to prevent the accumulation of foreign materials. The sleeves 156 are adapted to accommodate movement of the control rods 142. The sleeves 156 are fixedly attached to the bulkhead 160 of frame 22 with attachment nut 161. Attachment nut 161 also provides cable length adjustment.

Each of the second cable ends 154 is attached to controls 52 of the mechanism 50 that is to be controlled by the joystick 20.

For example, mechanism 50 comprises two hydrostatic transmissions 180 with independent controls 52a and 52b. The two hydrostatic transmissions 180 driven by a power plant 232, for example, may be used to drive a right and left drive wheel of a zero turning radius vehicle 233a and 233b. The frame 22 is mounted on the zero turning radius vehicle using attachment member 181 proximate an operating compartment of the vehicle (not shown). The speed and direction of the zero turning radius vehicle may be controlled by individually controlling the speed of drive wheels 233a and 233b on opposite sides of the vehicle using the joystick 20. By driving one wheel faster than the opposite wheel, the vehicle turns or pivots about the slower wheel. Preferably the zero turning radius vehicle moves in a direction and speed corresponding to the direction in which an operator moves the joystick 20.

Figure 3:
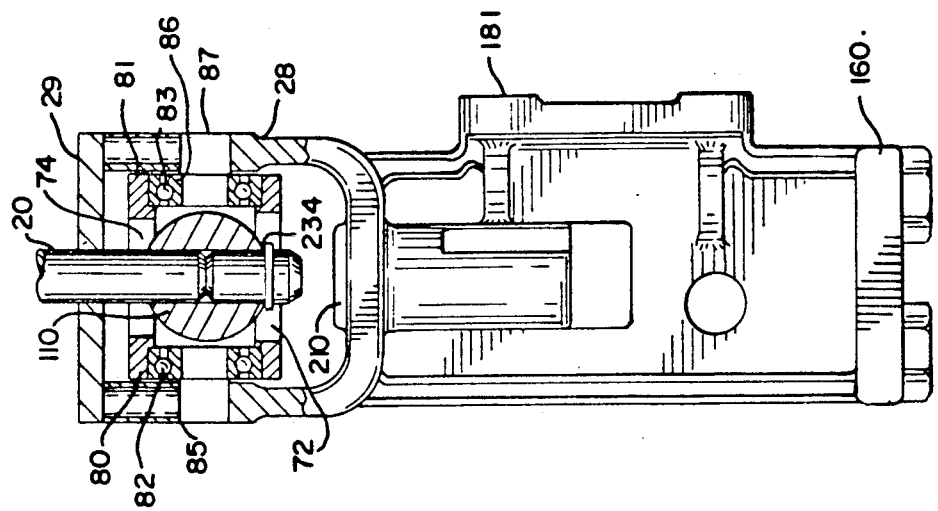
FIG. 3 is a right side view of the present invention in partial cross section.
Figure 4:
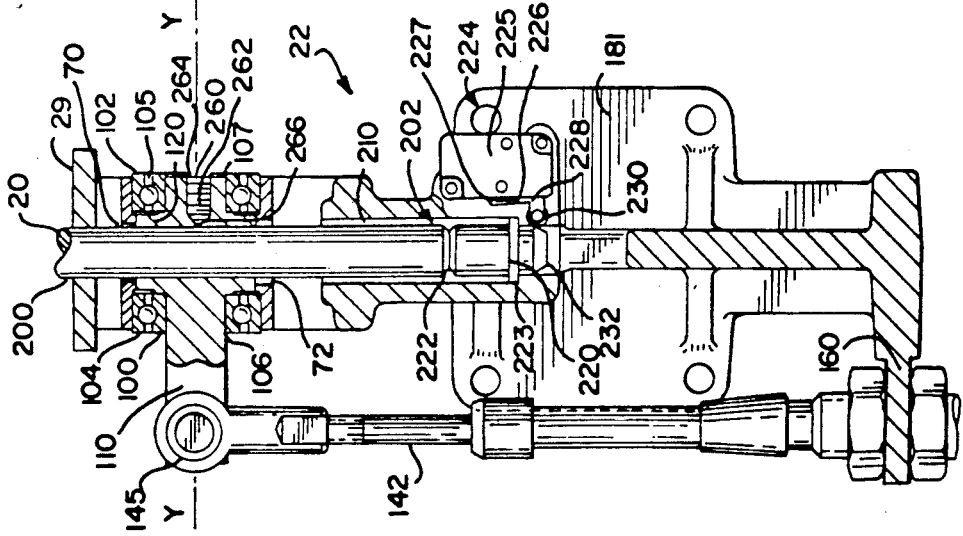
FIG. 4 is a back view of the present invention and partial cross section.

FIG. 3 shows joystick 20 in a downward position. The joystick 20 has a first end 200 and a second end 202. The first end 200 of the joystick 20 has an operator's handle 204. (See FIG. 1). When joystick 20 is in the downward position, the second joystick end 202 is inserted into a channel 210 at an intermediate portion of the frame 22. The channel 210 is in alignment with the top and bottom oval-shaped openings 70, 72 of the lever mount 30 and the bore 120 of the shaft 110. When the joystick 20 is in the downward position, the channel 210 presents a close fit thereby preventing the joystick 20 from pivoting. Therefore, the downward position is the nonoperating position.

The second joystick end 202 has a snap ring 220 and a circumferential detent 222 in vertical spaced relation. The snap ring 220 abuts a shoulder 223 in the channel 210 thereby defining the lowest position of the joystick 20.

An electric switch 224, preferably a miniature limit switch, is attached to an intermediate portion of the frame 22. The miniature limit switch 224 has a body 225 with an arm 226 having first and second ends 227, 228. The first arm end 227 is hingedly attached to the miniature limit switch body 225. An intermediate portion 229 of the arm 226 engages a switch (not shown). The second arm end 228 terminates in a roller 230. The roller 230 operatively engages a tapered portion 232 of the second joystick end 202 thereby deflecting the arm 226 toward the miniature limit switch body 225 thereby engaging the switch. When the joystick 20 is moved to an upward, operating position, the arm 226 deflects back against the frame 22 and deactivates the switch.

FIG. 7 shows the miniature limit switch 224 is wired in series to an ignition system 231 of a motion power source or power plant 232 such as a gas engine, electric motor, or the like, that supplies motor power to the hydrostatic transmission 180 so that the hydrostatic transmission 180 may not be started unless the joystick 20 is in the downward position. Therefore, the zero turning radius vehicle may not be started when the joystick 20 is in the operating position, thereby preventing the zero turning radius vehicle from lurching forward when starting the vehicle.

The upward most position of joystick 20 (See FIG. 4) is obtained when the joystick is moved upward along line Z—Z until the snap ring 220 abuts a lower portion 234 of the shaft 110. A spring loaded ball plunger 260 (See FIG. 3) with external threads 262 is threaded into the a set of internal threads 264 provided in the second shaft end 114. The spring loaded ball plunger 260 has a ball bearing 266 and a spring (not shown). When the ball plunger 260 is threaded into the second shaft end 114, the ball bearing 266 extends into the first bore 120 of the shaft 110 and engages the joystick 20. The joystick 20 is held in the upward position when the ball bearing 266 snappingly engages the circumferential detent 222.

To move the joystick 20 back into the downward, nonoperating position, the joystick 20 is centered and pushed downward along line Z—Z to snappingly disengage the ball bearing 266 from the circumferential detent 222. The second joystick end 202 is guided into channel 210 to lock the joystick 20 from pivotal movement.

FIG. 2 shows joystick 20 being disposed through an opening 280 in endplate 29. The opening 280 is in alignment with the top opening 70 of the lever mount 30. The endplate opening 280 is designed to form a template 281 to guide the joystick 20 through a desired range of motions, controlling the zero turning radius vehicle through a range of desired speeds and directions.

For example, when joystick 20 is in position A at the intersection of lines X—X and Y—Y there is no displacement of the cables 32, thereby defining a neutral position.

To provide for tandem movement of the cables 32, ie., movement of both cables 32 in the same direction, the joystick 20 must be moved along line Y—Y to position B or C. Movement of the joystick 20 to position B causes the lever mount 30 to pivot about line X—X thereby causing both ends of the control rods 142 to move up causing a simultaneous upward displacement of both cables 32. Movement of the joystick 20 to position C causes the lever mount 30 to pivot about line X—X thereby causing a downward displacement of both cables 32 simultaneously.

To provide reciprocal movement of the cables 32, i.e., movement of the cables 32a and 32b in opposite directions, the operator must move the joystick 20 to positions D or E. Movement of the joystick 20 to position E causes the shaft 110 to rotate about the line Y—Y in a clockwise fashion as viewed from FIG. 1. The clockwise rotation of the shaft 110 causes the left end of the cross bar 140 to move up and the right end of the cross bar 140 to move down simultaneously thereby causing a corresponding upward displacement of cable 32b and a downward displacement in the cable 32a.

Movement of the joystick 20 to position D causes a counterclockwise rotation of the shaft 110 as viewed from FIG. 1, causing the left side of the cross bar 140 to move downward and the right side of the cross bar 140 to move upward simultaneously thereby causing a corresponding reciprocal displacement in the cables 32.

Movement of the joystick 20 in directions other than along line X—X or line Y—Y will cause both tandem and reciprocal displacement of the cables 32. For example, movement of the joystick 20 to position F will cause maximum upward displacement of the cable 32b together with a downward displacement of the cable 32a.

Movement of the joystick 20 to position G will cause maximum upward displacement of cable 32a together with a downward displacement of cable 32b.

Movement of the joystick 20 to position H will cause the lever mount 30 to pivot downward, and the cross bar 140 to rotate counterclockwise along line Y—Y resulting in a maximum downward displacement of cable 32b and an upward displacement of cable 32a.

Movement of joystick 20 to position J causes the lever mount to rotate downward about line X—X and shaft 110 to rotate clockwise about line Y—Y causing a maximum downward displacement of cable 32a and a vertical displacement of cable 32b.

Preferably the joystick 20 is used to control independent hydrostatic transmission 180 on the zero turning radius vehicle (not shown). The joystick 20 should be mounted on the vehicle so that the joystick, as viewed in FIG. 1, should face the rear of the vehicle. The motor controls 52 are adapted to control the hydrostatic transmission 180 to drive the vehicle forward when the cables 32 are pulled by an upward movement of the cross bar 140, and to drive the vehicle in reverse when the cables 32 are pushed by a downward movement of the cross bar 140. The greater the distance the joystick 20 is from the neutral position A, a greater the displacement of the cables 32; therefore, the greater the speed of the vehicle.

For example, moving the joystick 20 to position B causes the maximum vertical displacement of the cables 32 driving the zero turning radius vehicle forward at a maximum speed. Moving the joystick 20 to position C causes the vehicle to move in reverse. Preferably, the template 281 is designed to limit the rearward speed to be less than the forward speed.

The vehicle may be turned while moving forward by moving the joystick 20 in the direction an operator wishes to turn. To turn right, the operator must move joystick 20 to the right to position F; driving the left wheel faster than the right wheel causing the vehicle to turn right. To turn left the operator need only move the joystick 20 to the left to position G. The difference in displacement of the cables 32a and 32b causes the right wheel to move faster than the left wheel causing the vehicle to turn to the left.

To make a turn while the vehicle is not moving forward one need only move the joystick to position E to turn right, and to position D to turn left. To make a turn in reverse while not moving in reverse, the operator need only move the joystick 20 to position H to turn right and to position J to turn left.

It is desirable when operating the vehicle with the joystick 20 that the joystick 20 be returned to the neutral position A when the joystick 20 is not being directed by the operator. This will ensure that when the operator of the zero turning radius vehicle dismounts the vehicle that the joystick 20 automatically returns to neutral. To this end, a return to neutral mechanism 300 is provided on the motor controls 52. (See FIG. 1). A cam bar 310 having first and second ends 312 and 314 are mounted to the hydrostatic transmission 180 with a mounting bolt 320 allowing pivotal movement of the cam bar 310. The first end of the cam bar 312 has a generally V-shaped notch 330 that engages a portion 332 of the motor control 52. The second cam bar end 314 has an eyelet 334. A spring 336 having first and second ends 338, 340, has its first end 338 attached to the cam bar eyelet 334 and its second spring end 340 attached to a portion 342 of frame 350 of the vehicle.

The controls 52 are adapted to move about a pivot 360 in response to movement of the cables 32 caused by movement of the joystick 20. When the operator of the vehicle does not apply pressure on the joystick 20 in any particular direction, the spring 336 provides sufficient tension upon the cam bar 310 to return the controls 52 to a neutral position, thereby moving the joystick 20 to the neutral joystick position A.

For example, if the operator is driving the vehicle forward by moving the joystick to position B causing the cables 32 to move upward thereby causing the controls 52 to pivot upward in FIG. 1, and the operator of the vehicle subsequently releases the joystick 20, the spring 336 overcomes the tension in the cables and returns both the controls 52a and 52b to a neutral position and the joystick 20 to a neutral position A.

Although we have described the present invention as having a frame 22 mounted on the zero turning radius vehicle with the joystick 20 pointed forward, it can also have any arrangement on the zero turning radius vehicle so that joystick 20 allows for a proper direction for steering.

FIG. 6 shows a second preferred embodiment of the present invention replacing the cables 32 with a series of connected rods 400. A first rod 402 having first 404 and second 406 opposed ends, has its first end 404 rotatably attached to the second control rod ends 144. The second end 406 of the first rod 402 is fixedly attached to a pivot 410. A second rod 420 having first 422 and second 424 opposed ends, has its first end 422 fixedly attached to the pivot 410 to maintain an angle $\alpha$, preferably 90 degrees, between the second rod 420 and the first rod 402. The second end 424 of the second rod 420 is attached to a third rod 430 at its first end 432. A second end 434 of the third rod 430 is attached to the controls 52 of the hydrostatic transmissions 180.

Movement of the joystick 20 in a first plane causes reciprocal or tandem movement of the control rods 142 in a second plane perpendicular to the first plane, causing the first 402 and second rods 420 to rotate about the pivot 410, causing translational motion of the third rod thereby controlling the hydrostatic transmission 180.

While the specific embodiments have been illustrated and described, numerous modifications come to mind without significantly departing from the spirit of the invention and the scope of protection is only limited by the scope of the accompanying claims.

I claim:

1. A control for translating motion comprising:
    a lever mount having first and second cylinders, said first cylinder having a first cylinder axis, said second cylinder having a second cylinder axis perpendicular to said first cylinder axis, said second cylinder being integral with said first cylinder;
    a shaft disposed coaxially within said second cylinder and rotatable about said second cylinder axis;
    a lever having first and second end portions; said lever having two degrees of mechanical freedom being movable about at least said first and said second cylinder axes, said second lever portion being attached to said shaft;
    an elongated cross bar having first and second portions, said cross bar being attached to said shaft intermediate of said cross bar first and second portions, said cross bar being substantially perpendicular to said second axis, said cross bar first and second portions move tandemly and reciprocatingly with respect to one another in response to movement by said lever;
    a means for attaching the first and second cross bar portions to a mechanism to be controlled by said lever.

2. The control of claim 1 wherein said shaft includes:
    a bore, said bore being adapted to receive said lever, said lever being movable through said bore along a Z axis that is essentially perpendicular to said first and second cylinder axes giving the lever a third degree of mechanical freedom such that said lever is movable from an upward operating position to a downward non-operating position.

3. The control of claim 2 wherein said lever includes:
    a means for preventing the pivotal movement of said lever when said lever is in said nonoperating position.

4. The control of claim 3 wherein said means for preventing the pivotal movement of said lever comprises:
    a cylindrical channel on said lever mount, said channel being in alignment with said bore on said shaft, said channel being dimensioned to receive said lever.

5. The control of claim 4 wherein said lever includes:
    means for guiding said lever through a desired range of motions.

6. The control of claim 5 wherein said means for guiding said lever through a desired range of motions comprises:
    a template, said first lever end portion being disposed through said template, said template having a shape that guides said lever through said desired range of motions.

7. The control of claim 1 wherein said means for attaching the first and second cross bar portions to a mechanism to be controlled by said lever comprises:
    a pair of cables.

8. The control of claim 1 wherein said means for attaching the first and second cross bar portions to a mechanism to be controlled by said lever comprises:
    a set of connected rods.

9. The control of claim 2 wherein said mechanism to be controlled comprises:
    a zero turning radius vehicle having a right and left drive wheel;
    a right and left hydrostatic transmission each having a control, said right motor drives said right wheel and said left motor drives said left wheel;
    a power plant coupled to said right and left hydrostatic transmissions to drive said right and left hydrostatic transmissions, said power plant having an ignition system to activate said power plant.

10. The control of claim 9 wherein said lever includes:
    means for disabling said ignition system of said power plant when said lever is in said operating position.

11. The control of claim 10 wherein said means for disabling said ignition system of said hydrostatic transmission of said zero turning radius vehicle comprises:
    an electric switch having a first switch position to complete an ignition circuit of said ignition system and a second switch position to interrupt said ignition circuit of said ignition system, said switch having a portion responsive to said second lever end portion, so that when said lever is in said downward position said electric switch is in said first position and when said lever is in said upward position said electric switch is in said second switch position.

12. The control of claim 2 wherein said lever includes a means for holding said lever in an operating position.

13. The control of claim 12 wherein said means for holding said lever in said operating position comprises:
   a circumferential detent intermediate said first and second lever end portions;
   a spring loaded ball bearing attached to said shaft, a portion of said ball bearing extends into said shaft bore and engages said detent when said lever is in said operating position, thereby holding said lever in said operating position.

14. The control of claim 13 wherein said lever includes a means for returning said lever to a neutral position.

15. The control of claim 14 wherein said means for returning said lever to a neutral position comprises:
   a cam bar having first and second ends, said first end of said cam bar having a substantially V-shaped portion adapted to engage said control of said hydrostatic transmission, said second end of said cam bar having a spring, said spring being adapted to move said control to a neutral position thereby moving said lever to said neutral position.

16. A control for translating motion comprising:
   a lever mount having first and second cylinders, said first cylinder having a first cylinder axis, said second cylinder having a second cylinder axis perpendicular to said first cylinder axis, said second cylinder being integral with said first cylinder;
   a shaft disposed coaxially within said second cylinder and rotatable about said second cylinder axis, said shaft having a portion removed to form a bore;
   a lever having first and second end portions, said lever having three degrees of mechanical freedom being movable about said first and second cylinder axes and along a Z axis perpendicular to said first and second cylinder axes, said second lever portion being attached to said shaft, said lever being movable from an upward operating position to a downward non-operating position along the Z axis through said bore of said shaft;
   a cylindrical channel on said lever mount and in alignment with said bore, said channel being adapted to receive said second lever portion when said lever is in said non-operating position to prevent the pivotal movement of said lever;
   an elongated cross bar having first and second portions, said cross bar being attached to said shaft intermediate of said cross bar first and second portions, said cross bar being substantially perpendicular to said second axis, said cross bar first and second portions move tandemly and reciprocatingly with respect to one another in response to movement by said lever;
   a means for attaching the first and second cross bar portions to a mechanism to be controlled by said lever.

17. A control for translating motion comprising:
   a lever having first and second end portions;
   a lever mount having a first and second shaft, said first shaft being attached to said second shaft, said second lever portion being attached to said second shaft, said first shaft being adapted to rotate about a first axis in response to movement of said first layer portion in a first direction, and said second shaft being adapted to rotate about a second axis perpendicular to said first axis when said first lever portion is moved in a second direction perpendicular to said first direction;
   a bore on said second shaft, said bore dimensioned to receive said second lever portion;
   a cylindrical channel on said lever mount having an axis along a Z axis and perpendicular to said first and second axes and in alignment with said bore, said channel being dimensioned to receive said second lever portion, said second lever portion being movable along said Z axis from an upward operating position into said channel to a lower non-operating position to prevent pivotal movement of said lever.

18. The control of claim 17 wherein said lever includes:
   means for guiding said lever through a desired range of motions.

19. The control of claim 16 wherein said means for guiding said lever through a desired range of motions comprises:
   a template, said first lever end portion being disposed through said template, said template having a shape that guides said lever through said desired range of motions.

20. The control of claim 17 wherein said mechanism to be controlled comprises:
   a zero turning radius vehicle having a right and left drive wheel;
   a right and left hydrostatic transmission each having a control, said right motor drives said right wheel and said left motor drives said left wheel;
   a power plant coupled to said right and left hydrostatic transmissions to drive said right and left hydrostatic transmissions, said power plant having an ignition system to activate said power plant.

21. The control of claim 20 wherein said lever includes:
   means for disabling said ignition system of said power plant when said lever is in said operating position.

22. The control of claim 21 wherein said means for disabling said ignition system of said hydrostatic transmission of said zero turning radius vehicle comprises:
   an electric switch having a first switch position to complete an ignition circuit of said ignition system and a second switch position to interrupt said ignition circuit of said ignition system, said switch having a portion responsive to said second lever end portion, so that when said lever is in said downward position said electric switch is in said first position and when said lever is in said upward position said electric switch is in said second switch position.

23. The control of claim 17 wherein said lever includes a means for holding said lever in said operating position.

24. The control of claim 23 wherein said means for holding said lever in an operating position comprises:
   a circumferential detent intermediate said first and second lever end portions;
   a spring loaded ball bearing attached to said second shaft, a portion of said ball bearing extends into said shaft bore and engages said detent when said lever is in said operating position, thereby holding said lever in said operating position.

25. The control of claim 17 wherein said lever includes a means for returning said lever to a neutral position.

26. The control of claim 25 wherein said means for returning said lever to a neutral position comprises:
   a cam bar having first and second ends, said first end of said cam bar having a substantially V-shaped portion adapted to engage said control of said hydrostatic transmission, said second end of said cam bar having a spring, said spring being adapted to move said control to a neutral position thereby moving said lever to said neutral position.

* * * * *

UNITED STATES PATENT AND TRADEMARK OFFICE
CERTIFICATE OF CORRECTION

PATENT NO. : 5,131,483
DATED : July 21, 1992
INVENTOR(S) : Donald H. Parkes

It is certified that error appears in the above-identified patent and that said Letters Patent is hereby corrected as shown below:

In column 2, line 59, delete "tat" and insert therefor --that--.

In column 5, line 1, delete "forward."

In column 7, line 59, delete ";" and insert therefor --,--.

In column 10, line 21, delete "16" and insert therefor --18--.

Signed and Sealed this

Twenty-eighth Day of December, 1993

Attest:

BRUCE LEHMAN

Attesting Officer

Commissioner of Patents and Trademarks